United States Patent [19]

Lange

[11] Patent Number: 4,488,153

[45] Date of Patent: Dec. 11, 1984

[54] DEVICE FOR WIRELESS DATA TRANSMISSION

[75] Inventor: Hans A. Lange, Brunswick, Fed. Rep. of Germany

[73] Assignee: Siemens Aktiengesellschaft, Berlin & Munich, Fed. Rep. of Germany

[21] Appl. No.: 323,284

[22] Filed: Nov. 20, 1981

[30] Foreign Application Priority Data

Jan. 20, 1981 [DE] Fed. Rep. of Germany ....... 3101636

[51] Int. Cl.$^3$ ............................................. G01S 13/78
[52] U.S. Cl. ............................... 343/6.5 SS; 343/713; 343/728
[58] Field of Search ................... 343/6.5 SS, 713, 717, 343/728, 787, 788; 455/41

[56] References Cited

U.S. PATENT DOCUMENTS 3,290,675 12/1966 Neild .............................. 343/6.5 SS
3,351,938 11/1967 Gray .............................. 343/6.5 SS
4,288,689 9/1981 Lemelson et al. ......... 343/6.5 SS X

OTHER PUBLICATIONS

Anon; *Aid for Drivers*; Wireless World, vol. 81, No. 1474, pp. 269-270, Jun. 1975.
Beyersdorff R., "Automatic Reading of Rolling Stock Identification Numbers", Siemens Review, vol. 31 (1964) No. 5, pp. 147-153.

*Primary Examiner*—T. H. Tubbesing
*Attorney, Agent, or Firm*—Hill, Van Santen, Steadman & Simpson

[57] ABSTRACT

Active interrogation devices which can be moved in a track direction relative to passive response devices transmit electrical energy to the response devices with the aid of ferrite rod antennae which are each arranged in the track direction and are contained in each interrogation device and each response device. In the response devices, this energy feeds a transmitting device by which an item of data assigned to a response device can be transmitted in the form of an electrical response signal to a frame antenna of each interrogation device and each response device to the interrogation device. The antenna arrangements can therefore be designed to be relatively narrow in the track direction without the signal for the data transmission exhibiting phase jumps.

3 Claims, 1 Drawing Figure

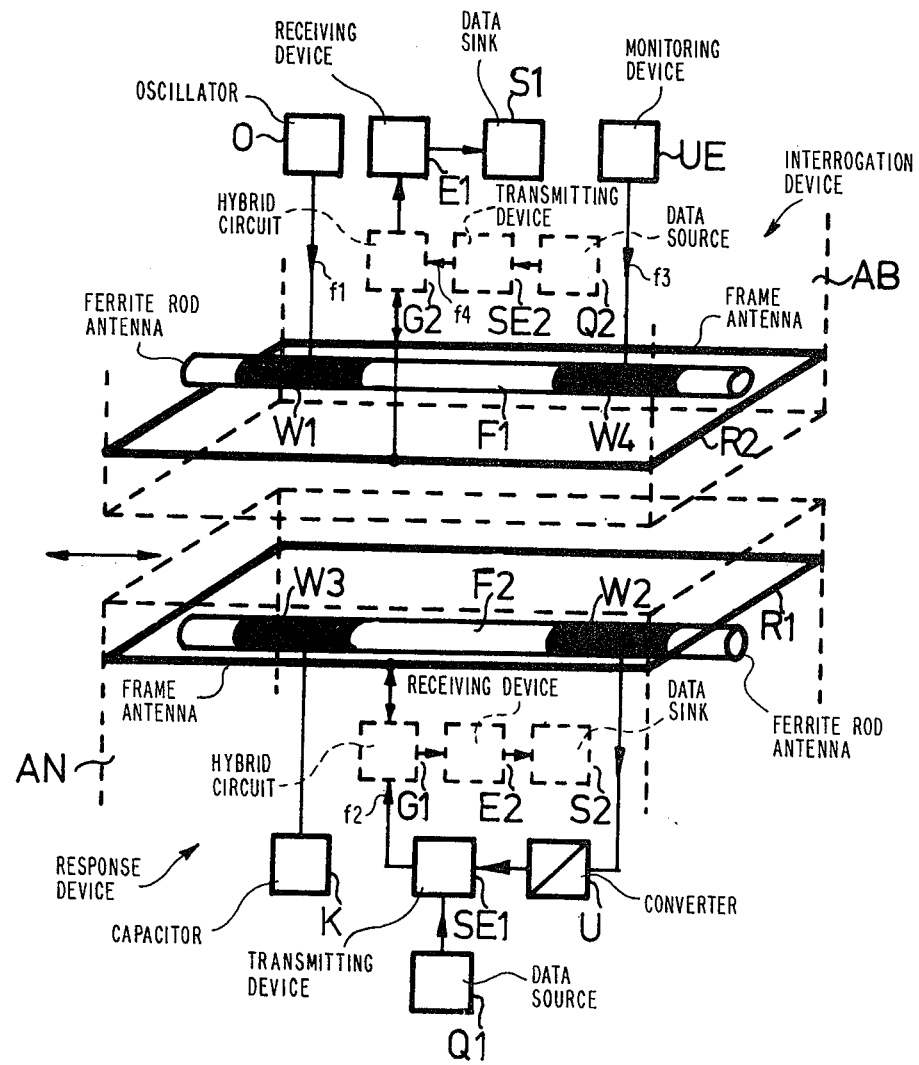

DEVICE FOR WIRELESS DATA TRANSMISSION

BACKGROUND OF THE INVENTION

1. Field of the Invention

The present invention relates to a device for wireless data transmission from a source to a sink, using ferrite rod and elongate frame antennae during the track-bound passage of a response device arranged at the source end and an interrogation device arranged at the sink end, wherein the interrogation device contains a transmitter which serves to transfer the energy for the transmission of an item of data to a receiver contained in the response device.

2. Description of the Prior Art

In order that items of data may be transferred in punctiform fashion from passive response devices to active interrogation devices between objects moving on tracks and link devices, devices of the type referred to above have been developed ("Automatisches Lesen von Kennungen fur Guterwagen", Siemens Magazine, 37th Edition Vol. 11, November 1973, pp. 779–785). In devices of this type, the actual data transmission takes place by way of a plurality of ferrite rod antennae which are arranged transversely to the track direction, whereas the energy transfer takes place via frame antenna.

In the event that the antenna arrangement is to be relatively narrow in the track direction, a configuration of this type is not suitable.

For these circumstances, an apparent idea would be to arrange the ferrite rode antennae provided for the data transmission in the track direction. As a result, the energy transfer and the data transfer would still be decoupled from one another by a difference of 90° in the polarization direction of the corresponding electrical signals, but such an arrangement would have the disadvantage that on passing ferrite rod antennae of the response device and of the interrogation device arranged in the track direction, the signal which serves for data transmission would be input coupled into the receiving ferrite rod antenna with a phase position which changes twice by 180°. It would require a high technological expense to analyze such a signal.

SUMMARY OF THE INVENTION

It is therefore the object of the invention to design a device of the type generally referred to above in such a manner that the antenna arrangements can be narrow in the track direction without the electrical signal for the data transfer containing phase jumps.

Taking into account the recognition that phase jumps in the received signal of the energy transmission channel are tolerable, because in order to make available the energy this signal need not be analyzed but merely rectified and smoothed, the above-mentioned object is achieved in that the interrogation device and the response device each contain a ferrite rod antenna which is arranged in the direction of passage and which serves to transmit energy and to receive energy, respectively, and also each contain a frame antenna which is operative over the active length of the assigned ferrite rod antenna and which serves to receive and transmit data, respectively.

For reasons of availability, it proves advantageous to use identical antenna arrangements for the interrogation device and for the response device.

If the interrogation device contains a monitoring device which serves to detect a resonant oscillating circuit of the response device, it is therefore possible to easily detect the breakdown of the devices provided for the data transmission.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which is a schematic representation in block diagram form, of an interrogation device AB and a response device AN, each of which can be moved relative to one another in a track-bound manner, as symbolized by a double-headed arrow.

The interrogation device AB comprises an oscillator O having an operating frequency f1, whose output signal is fed to a first winding W1, which like all other windings is represented by a filled-in panel, of a ferrite rod antenna F1 of the interrogation device AB. During the passage of the ferrite rod antenna F1 relative to a ferrite rod antenna F2 of the response device AN, the latter ferrite rod antenna receives the signal of the frequency f1 of the oscillator O with the aid of a winding W2. In the response device AN, the transmission energy for a transmitting device SE1 is obtained from the received signal via a converter U and conducts a transmitted signal, modulated in accordance with an item of data from a source Q1, of a middle frequency f2 to a frame antenna R1 which is spatially assigned to the ferrite rod antenna F2. During the passage of the ferrite rod antennae F1 and F2, the frame antenna R1 acts upon a frame antenna R2 of the interrogation device AB. The signal of the middle frequency f2 received by the frame antenna R2 is fed to a receiving device E1 which detects the relevant data from the source Q1 and feeds the same to a sink S1.

In order to be able to reliably detect an interruption in the data transmission, a winding W3 which cooperates with a capacitor K is arranged on the ferrite rod antenna F2. Together with the capacitor K, this winding forms a resonant oscillating circuit which is tuned to a frequency f3 and which, in the event of each passage of the interrogation device AB relative to a response device, e.g. AN, exerts a reliably detective reaction on a monitoring device UE which is connected to a winding W4 of the ferrite rod antenna F1 and which continuously emits a signal of the frequency f3.

In the event that items of data are not only to be transmitted from the response device AN to the interrogation device AB, but in addition data is to be transmitted from a source Q2 in the region of the interrogation device AB to a sink S2 in the region of the response device AN, it proves advantageous for the source Q2 to control a transmitting device SE2 whose signal, having a middle frequency f4, is fed via a hybrid circuit G2 to the frame antennae R2 and R1 and via a hybrid circuit G1 to a receiving device E2. The items of data detected by the latter are forwarded to the sink S2. The circuit elements additionally required for duplex transmission of this kind have been represented in broken lines on the drawing.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Apparatus for wireless data transmission from a data source to a data sink, permitting the storing and/or processing of received data, in a track-bound system, comprising:
   a response device including the data source;
   an interrogation device including the data sink;
   an energy transmitter in said interrogation device;
   a converter in said response device;
   an interrogation device ferrite rod antenna connected to said energy transmitter and a response device ferrite rod antenna connected to said converter, both ferrite rod antennae arranged in the direction of the track;
   a first frame antenna in said interrogation device and a second frame antenna in said response device, each of said frame antennae mounted adjacent the respective ferrite rod antenna and includes a dimension to be operative over the length of influence of the respective ferrite rod antenna;
   a data receiving device connected between said first frame antenna and said data sink; and
   a transmitting device connected to said second frame antenna, to said converter and to said data source.

2. The apparatus of claim 1, wherein:
   said ferrite rod and frame antennae of said interrogation and response devices being of identical structure.

3. The apparatus of claim 1, wherein:
   said response device includes a resonant circuit comprising a winding on said response device ferrite rod antenna and a capacitor connected to said winding; and
   said interrogation device includes a winding on said interrogation device ferrite rod antenna and a monitor connected to that winding for detecting the oscillations of said resonant circuit.

* * * * *